(12) United States Patent
Watfa et al.

(10) Patent No.: US 10,043,193 B2
(45) Date of Patent: Aug. 7, 2018

(54) IMAGE CONTENT BASED ADVERTISEMENT SYSTEM

(75) Inventors: Allie K. Watfa, Urbana, IL (US); Dale Nussel, Mahomet, IL (US); Jonathan Kilroy, Champaign, IL (US)

(73) Assignee: Excalibur IP, LLC, New York, NY (US)

(*) Notice: Subject to any disclaimer, the term of this patent is extended or adjusted under 35 U.S.C. 154(b) by 970 days.

(21) Appl. No.: 12/690,309

(22) Filed: Jan. 20, 2010

(65) Prior Publication Data

US 2011/0178871 A1 Jul. 21, 2011

(51) Int. Cl.
  *G06Q 30/00* (2012.01)
  *G06Q 30/02* (2012.01)

(52) U.S. Cl.
  CPC ......... *G06Q 30/02* (2013.01); *G06Q 30/0255* (2013.01)

(58) Field of Classification Search
  CPC ........... G06Q 30/0241; G06Q 30/0244; G06Q 30/0251; G06Q 30/0255; G06Q 30/0257; G06Q 30/0271; G06Q 30/0275
  USPC ............ 725/32, 34, 51, 60; 705/14.4, 14.43, 705/14.49, 14.53, 14.55, 14.67, 14.71
  See application file for complete search history.

(56) References Cited

U.S. PATENT DOCUMENTS

| | | | |
|---|---|---|---|
| 5,416,900 A * | 5/1995 | Blanchard et al. | 715/804 |
| 5,859,920 A * | 1/1999 | Daly et al. | 382/115 |
| 6,044,156 A * | 3/2000 | Honsinger et al. | 380/54 |
| 6,282,713 B1 * | 8/2001 | Kitsukawa et al. | 725/36 |
| 6,470,094 B1 * | 10/2002 | Lienhart | G06K 9/325 382/171 |
| 6,654,725 B1 * | 11/2003 | Langheinrich et al. | 705/14.52 |
| 7,269,837 B1 * | 9/2007 | Redling et al. | 725/43 |
| 7,386,789 B2 * | 6/2008 | Chao | G06F 17/24 707/999.003 |
| 7,542,610 B2 * | 6/2009 | Gokturk et al. | 382/209 |
| 7,876,978 B2 * | 1/2011 | Berger et al. | 382/299 |
| 8,130,238 B2 * | 3/2012 | Distler | 345/619 |
| 8,160,398 B1 * | 4/2012 | Avidan et al. | 382/298 |
| 8,532,346 B2 * | 9/2013 | Thorn | 382/118 |
| 8,560,391 B1 * | 10/2013 | Shaw et al. | 705/14.61 |
| 8,610,738 B2 * | 12/2013 | Choe et al. | 345/590 |
| 8,656,295 B2 * | 2/2014 | Decker | 715/770 |
| 2001/0054029 A1 * | 12/2001 | Williams | 705/52 |
| 2002/0046100 A1 * | 4/2002 | Kinjo | 705/14 |
| 2002/0055955 A1 * | 5/2002 | Lloyd-Jones et al. | 707/512 |
| 2002/0078456 A1 * | 6/2002 | Hudson et al. | 725/60 |
| 2003/0097301 A1 * | 5/2003 | Kageyama et al. | 705/14 |
| 2004/0179103 A1 * | 9/2004 | Endo et al. | 348/207.2 |
| 2005/0030588 A1 * | 2/2005 | Reese et al. | 358/3.28 |

(Continued)

*Primary Examiner* — Bennett M Sigmond
(74) *Attorney, Agent, or Firm* — Brinks Gilson & Lione

(57) ABSTRACT

A system for serving an advertisement in a networked environment receives data that defines a user selection of an image. The system also selects an advertisement associated with the user selection and communicates the selected advertisement to the user. The data that defines the user selection includes an x selection coordinate, a y selection coordinate, a width, and a height that defines a region of an image. The user selection defines also defines a scene of a video. The system also includes circuitry and logic configured to extract text and to detect objects from an image region defined by the user selection and to select an advertisement associated with any extracted text and/or detected object.

22 Claims, 7 Drawing Sheets

(56) References Cited

U.S. PATENT DOCUMENTS

| | | | | |
|---|---|---|---|---|
| 2006/0282864 | A1* | 12/2006 | Gupte | 725/89 |
| 2007/0041642 | A1* | 2/2007 | Romanoff | G06K 9/00463 382/177 |
| 2007/0253031 | A1* | 11/2007 | Fan | 358/3.27 |
| 2008/0195938 | A1* | 8/2008 | Tischer et al. | 715/255 |
| 2008/0319844 | A1* | 12/2008 | Hua et al. | 705/14 |
| 2008/0320531 | A1* | 12/2008 | Kim et al. | 725/87 |
| 2009/0089830 | A1* | 4/2009 | Chandratillake et al. | 725/32 |
| 2009/0094105 | A1* | 4/2009 | Gounares et al. | 705/14 |
| 2009/0231455 | A1* | 9/2009 | Emery | 348/222.1 |
| 2010/0031196 | A1* | 2/2010 | Ordody et al. | 715/810 |
| 2010/0287580 | A1* | 11/2010 | Harding et al. | 725/14 |

* cited by examiner

IMAGE CONTENT BASED ADVERTISEMENT SYSTEM

BACKGROUND

The Internet has emerged as a powerful advertising tool. It is commonplace to see advertisements on many web sites. For example, advertisements may be displayed on search web sites and may be targeted to individuals based upon search terms provided by the individuals. Other web sites, such as news and sports web sites, may provide space for advertisements. The owners of these web sites may sell advertising space to advertisers to offset the costs associated with operating the web sites as well as to turn a profit.

Internet based video streaming and image browsing have also been growing in popularity. For example, web sites, such as YouTube® and Hulu® enable users to select video clips, such as television programs, movies, or personal videos, for display on a browser. In some cases, commercials are inserted between scenes of a video or are adjacent to the images. For example, Hulu® videos typically include commercials inserted between arbitrary scenes of a given video.

Currently, however, advertisements associated with the videos are only tangentially related to a given video. For example, an automobile advertisement may simply be inserted between scenes of a video that are not related to automobiles. This tends to diminish the effectiveness of the advertisement, which results in a lower associated conversion rate for the advertisement.

DETAILED DESCRIPTION

The embodiments below describe an exemplary embodiment of a system for improved display of images, such as pictures or videos. Generally, the system enables conveying additional information or even advertisements, where the other information is related to the content of the image. For example, additional text or an advertisement may be related to text or an object shown in the image. Alternatively or in addition, an advertisement may be related to a given image in its entirety, such as a scene from a video.

The system enables users viewing the image to select an area of the image or video and to retrieve an advertisement or other information associated with the content of the selected area.

In some implementations, data that defines the advertisement or other information may be embedded within the image itself. For example, data that defines an advertisement tag associated with an advertisement may be embedded in the data that defines a video.

In other implementations, data that defines selectable objects may be embedded in the image. The data may enable highlighting an object in an image for which an advertisement or other information is available. The selectable object may be highlighted when it is displayed or, for example, when a pointer or cursor is moved over or near the selectable object. The selectable object may also be highlighted under other circumstances.

Figure 1:
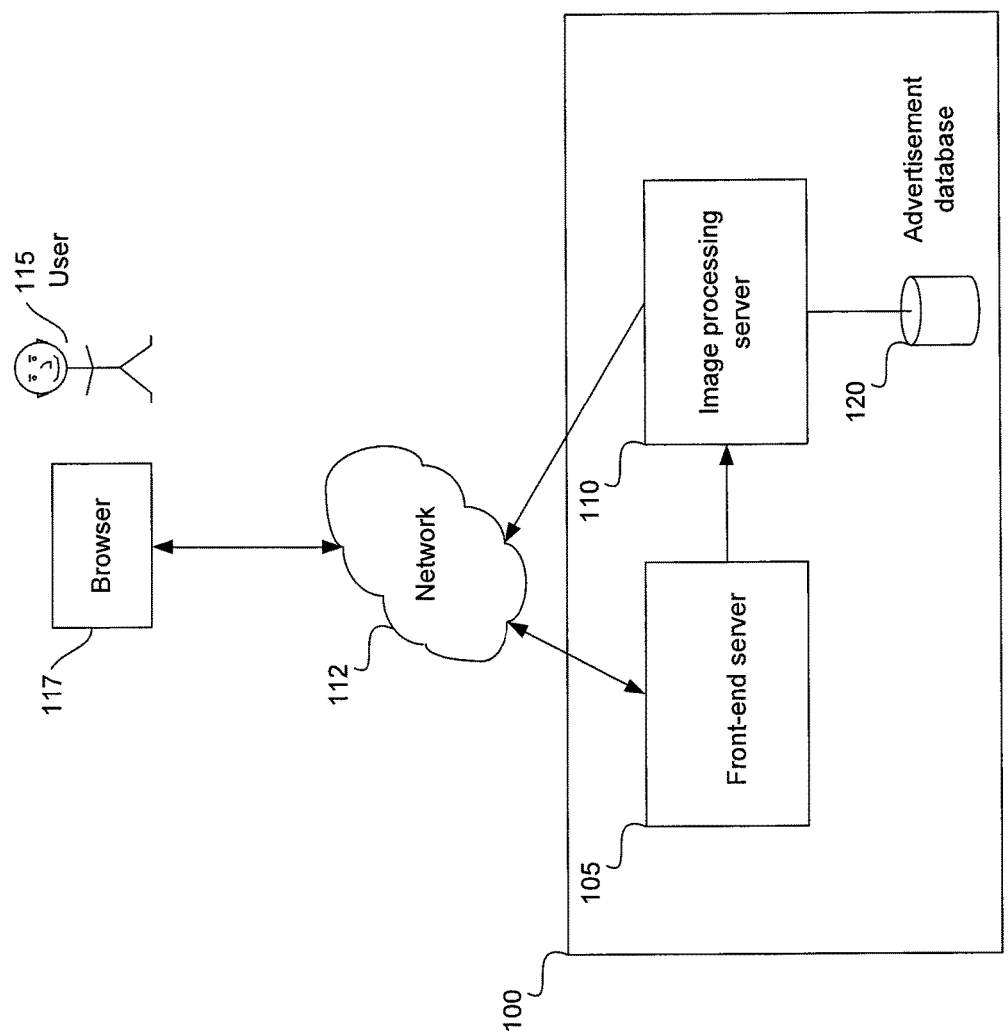
FIG. 1 is a block diagram of a system for communicating images and advertisements associated with the images.

FIG. 1 is a system 100 for communicating images and advertisements associated with the images. As used herein, the term image includes data that cooperates with a processor to produce a static image, such as a still picture; sequences of images, such as a video; and/or a scene from a video. The system 100 includes a front-end server 105, an image processing server 110, and an advertisement database 120. The various components of the system 100 may reside on a single computer or be distributed between several computers interconnected by a communication network.

The front-end server 105 and image processing server 110 may correspond to an Intel®, AMD®, or PowerPC® based computer operating a Microsoft Windows®, Linux, or other Unix® based operating system. The front-end server 105 and image processing server 110 may be configured to communicate with other computers via an interface, such as a network interface. The image processing server 110 may be configured to communicate data to and from the advertisement database 120 or other databases or systems.

The front-end server 105 may include code, logic, and/or other circuitry that enables the reception of a request to serve an image to a user 115, and to communicate the requested image to the user 115. For example, the front-end server 105 may correspond to a web server operable to generate web pages that display static images and/or video streams.

The image processing server 110 may include code, logic and/or other circuitry that enables the determination of advertisement content associated with an image or video selected by a user 115. For example, the image processing server 110 may be configured to select advertisements associated with an image or a portion of an image. In some implementations, a given image may be associated with numerous advertisements. For example, text displayed in a given image may be associated with advertisements related to the displayed text. Objects displayed in the same image may be associated with advertisements related to the displayed object. The entire image may be associated with a given advertisement.

In some implementations, the image processing server 110 includes subsystems operable to embed advertisement information or other information into an image or video requested by a user 115. For example, an advertiser may have previously bid on monetizable content, such as a movie scene, video, text or objects within an image, and/or the entire image much in the same way as advertisers currently bid on key words in sponsored search systems such as Yahoo! Search®. Data that defines an advertisement to be associated with the monetizable content may then be embedded into the data that defines the image or video. For example, data that defines an advertisement tag may be embedded into the data that defines the image or video. A request to retrieve an advertisement associated with an advertisement tag may be communicated to an advertisement server under various conditions. For example, the request may be generated on a periodic basis, such as every 5 minutes, by a browser through which the image is viewed. The request may also be generated when a user 115 clicks on a particular image, such as a scene or object in a video. An advertisement tag associated with the selection may then be communicated to an advertisement server (not shown) when the user 115 clicks the image. The advertisement server may then communicate the advertisement associated with the advertisement tag to the user 115.

The advertisement associated with a given advertisement tag may be inserted into a video stream in much the same way as a television commercial is embedded between portions of a television program. In addition or alternatively, the advertisement may be shown next to the image or video. For example, a display region may be provided adjacent to an image or video.

In some implementations, the image processing server is also configured to embed data that defines selectable objects within the image or video. The data may be operable by a browser 117 to cause the browser to highlight selectable objects when they are shown in an image. This enables a user 115 to identify objects that may be associated with advertisements or other information.

The image processing server 110 may also be configured to retrieve advertisements and/or other information related to a region of an image, video, and/or scene selected by a user 115. For example, a user 115 may click on a particular scene, text, or object in an image or video shown on a browser 117 that operates on a computer (not shown). Data that defines the selected image region may be communicated to the image processing server 110. For example, x and y coordinates that define the position where the user 115 clicked the display may be communicated by the browser 117. In some implementations, data that defines a selection box may also be communicated to the image processing server 110 from the browser 117. For example, the position and size of the selection box may be communicated to the image processing server 110. The image processing server 110 may be configured to analyze the selected image region and to select an advertisement or provide other information that is related to the content of the image region. For example, text within a user selection may be related to an advertisement. An object within the user selection may also be associated with an advertisement. The scene within which the user 115 made the selection may also be related to an advertisement. The image processing server 110 may select an advertisement associated with the user selection and communicate the advertisement to the user 115.

Figure 2:
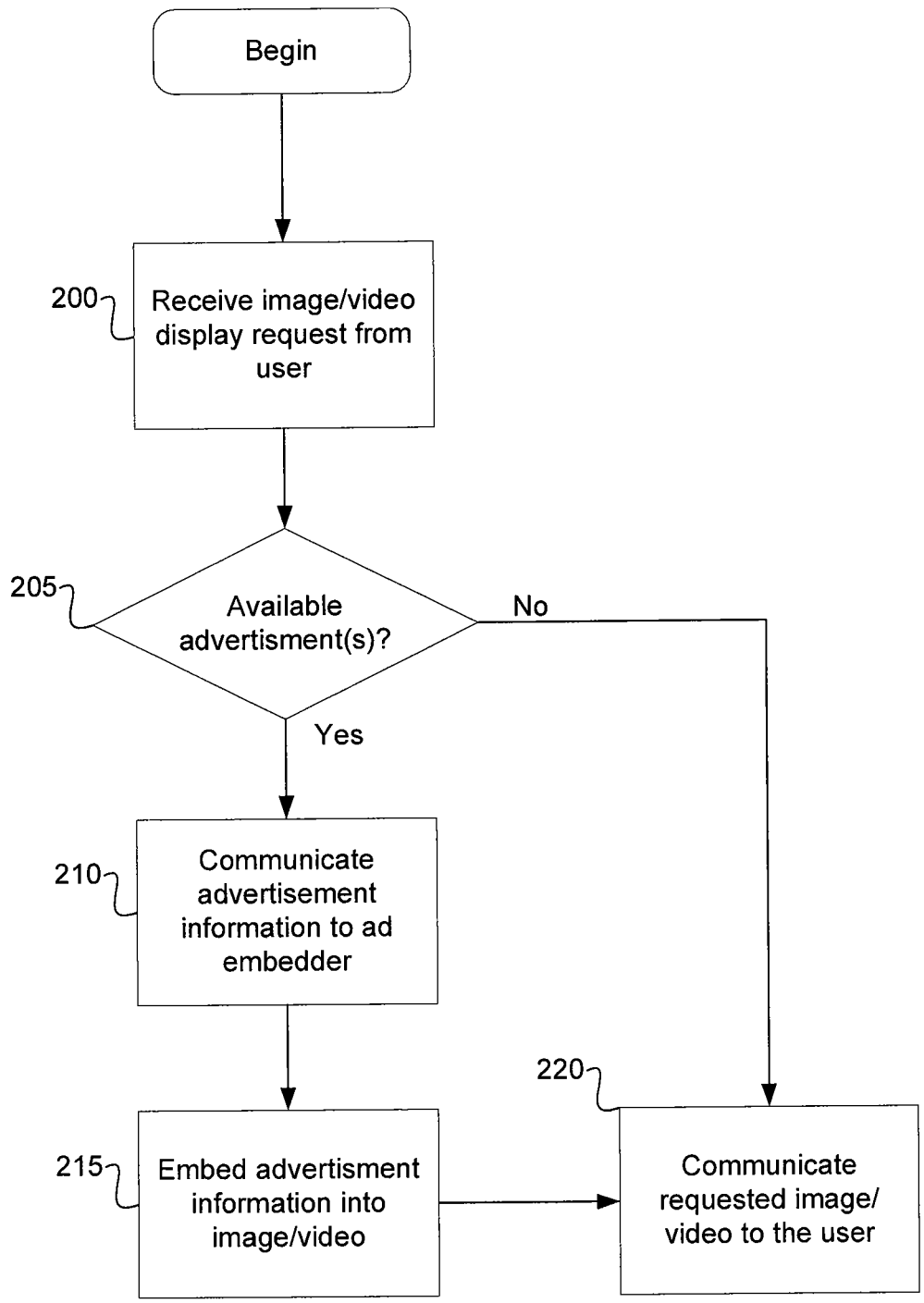
FIG. 2 is a flow diagram of operations for embedding advertisement information into an image.

FIG. 2 is a flow diagram of operations for embedding advertisement information into an image, such as a picture or video. The operations below may be performed by the system 100 of FIG. 1. At block 200, an image or video request may be received by the system 100. For example, a user 115 (FIG. 1) may communicate a request for an image or video to the front-end sever 105 (FIG. 1) via a network 112 (FIG. 1).

If at block 205, there are no advertisements or there is no other information associated with the requested image, then at block 220, the requested image is communicated to the user 115. For example, data that defines an advertisement tag, as described above, may not be embedded into the data that defines the image or video, which may indicate that there are no advertisements associated with the requested image.

If there are advertisements and/or there is other information related to the requested image or video, then at block 210, data that defines the related advertisements and/or the other information may be communicated to an advertisement embedding subsystem. For example, the front-end server 105 may communicate information that defines the selected image/video to the image processing server 110 (FIG. 1). The image processing server 110 may then search an advertisement database 120 (FIG. 1) for advertisements that are related to the image or video selected by the user 115.

In some implementations, images and videos are analyzed to identify monetizable content. The analysis may be performed automatically or by a person. For example, as described below, text recognition algorithms and object detection algorithms may be utilized to identify text and objects in a given image or video. In addition or alternatively, the image or video may be analyzed by a human in cases where an automatic system may have difficulty.

Figure 4:
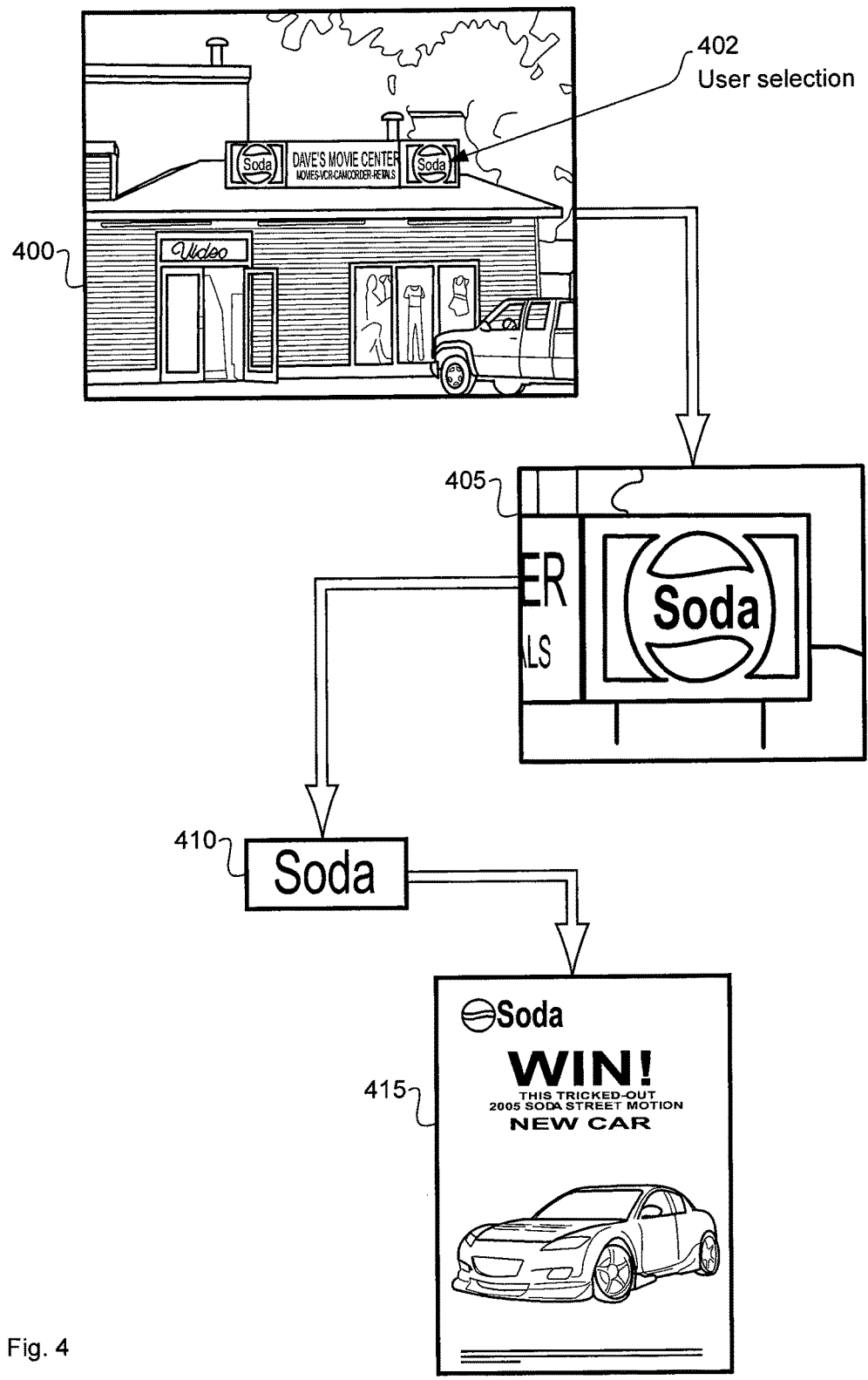
FIG. 4 illustrates the association of the text of an image with an advertisement.
Figure 6:
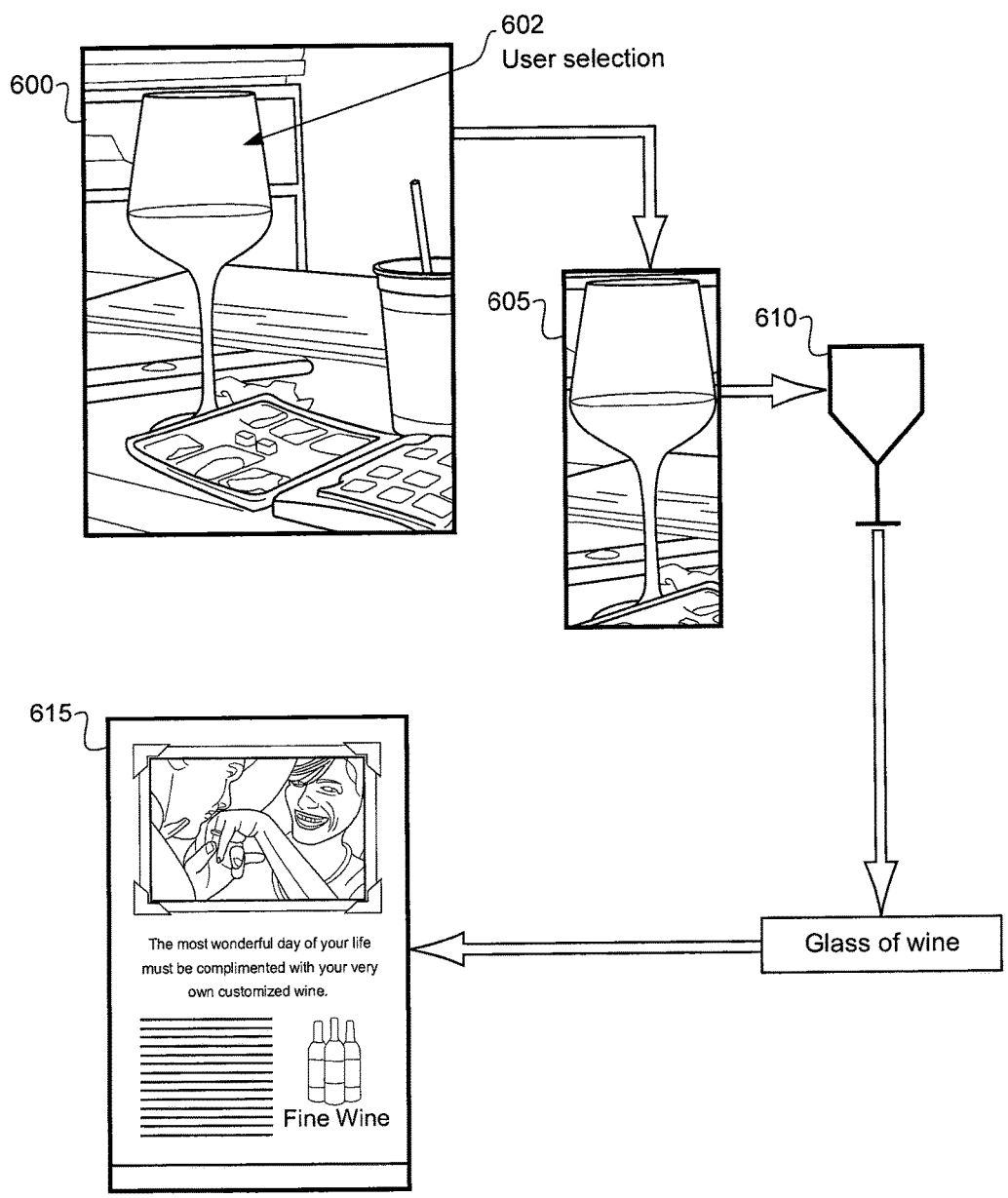
FIG. 6 illustrates the association of a detected object of an image with an advertisement.

Text identified may include, for example, text associated with a company's trademark, as will be described below in conjunction with the illustrations of FIG. 4. Various objects may also be identified. For example, a glass of wine may be identified, as will be described below in conjunction with the illustrations of FIG. 6. In some implementations, the text and objects identified in an image or video may be stored to a database (not shown) and associated with the image or video. Advertisers may then be offered the opportunity to bid on the items found in an image or video. For example, a winery may wish to bid for the opportunity to have an advertisement associated with a wine glass found in an image or video. The owner of the trademark may wish to bid for the opportunity to have an advertisement associated with any trademarks owned by the owner.

At block 215, data that defines the related advertisements and/or other information may be embedded into the image or video requested by the user 115. For example, an advertisement embedding subsystem (not shown) of the image processing server 110 may insert advertisement tag information into the image or video. Code operating on a browser to which the image or video is delivered may be operable to retrieve advertisements associated with the advertisement tag information from an advertisement server and, for example, insert the advertisements between scenes of a video or place the advertisement in a designated region of a static image. For example, an advertisement may be inserted between scenes of a video by stopping a video and then displaying an advertisement over the region of a display showing the video or a different region. Advertisements may also be shown as pop up ads floating over a web page or on the top, bottom, sides, or other parts of a web page.

In some implementations, the advertisement embedding subsystem may embed scripting information into the image or video. The scripting information may be operable by a browser (not shown) operating in conjunction with a processor of the user computer 115 or other device to cause the browser to communicate selections within an image or video made by the user 115 to the image processing server 110, as described below. For example, the scripting information may enable communicating the x and y coordinates of a selection made within an image or video by a user selection device, such as a mouse, light pen, joystick, keyboard, touch sensitive screen or other pointing device, that enables moving a pointer or cursor, or otherwise selecting a point or area on a display screen. The selection may be generated by actuating the user selection device. For example, clicking a mouse when the pointer is positioned over the image. In addition or alternatively, the user selection may occur when the pointer is positioned or dragged over the image. The scripting information may enable communicating data that defines a selected scene. For example, a frame number or other timing information that identifies a selected scene may be communicated. The scripting information may enable communicating data that defines a selected region, such as the position and size of a selection box for selecting a desired region.

At block 220, the requested image or video may be communicated to the user 115. For example, the image processing server 110 may communicate the image or video to the front-end server 105. The front-end server 105 may then communicate the image or video to the user 115. In some implementations, the image processing server 110 may be configured to bypass the front-end server and to communicate the image or video directly to the user 115.

Figure 3:
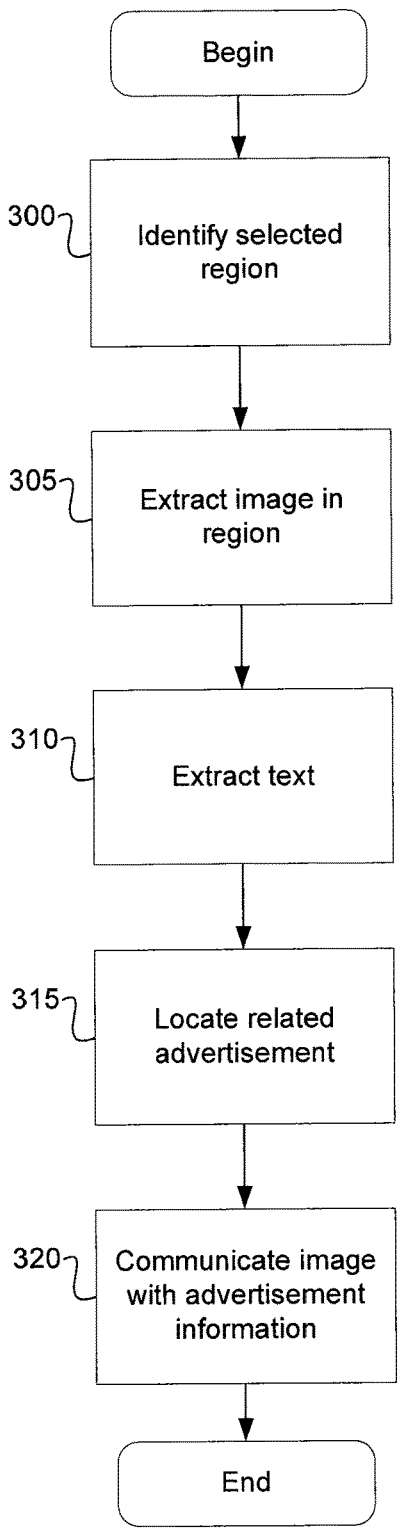
FIG. 3 is a flow diagram for detecting text in an image region defined by a user selection and for communicating an advertisement or other information associated with the detected text to the user.

FIG. 3 is a flow diagram illustrating a method for detecting text in a user selection and for communicating an advertisement or other information associated with the text to the user. The operations of FIG. 3 are more clearly understood in reference to the illustrations shown in FIG. 4, which illustrate an image and advertisement presented in the image. The operations shown in FIG. 3 may occur in conjunction with the operations of FIG. 5, described below, or alone.

At block 300, a region of a display image and/or video is selected by a user and communicated to the system. For example, a user 115 (FIG. 1) may initially be viewing an original image 400 (FIG. 1). The user 115 may select a region of interest of the original image 400 via a user selection as described above. The region of interest may include a highlighted object that indicates to the user 115 the association of an advertisement or other information with the highlighted object. Data that defines the user selection 402 may be communicated to the system 100 (FIG. 1). The user selection 402 may include data that defines x and y coordinates of a mouse click and/or the position and size of a selection box. The user selection 402 may also include data that defines a scene or a group of scenes selected from a video.

At block 305, an image region 405 associated with the user selection 402 may be extracted from the original image or video. In some implementations, data that defines the image region 405 of the original image 400, such as the actual pixels that define the image region 405, are communicated from a user's browser (not shown) to the system 100. In other implementations, the image region 405 associated with the user selection 402 is extracted from the data store where the image and/or video is located. For example, the image processing server 110 (FIG. 1) may extract the image region 405 from a database (not shown) that stores the image and/or video.

In some implementations, the size of the image region 405 is predetermined. For example, the size may correspond to a predetermined width and height, such as 100×100 pixels. In other implementations, the size of the image region 405 corresponds to a selection box generated by the user 115. In yet other implementations, the size of the image region 405 is determined based on the content of the image region 405. For example, the size of the image region 405 may correspond to a size that just captures all the characters in a particular piece of text located in the image region 405. The size of the image region 405 may be determined in other ways.

At block 310, text 410 within the image region 405 may be extracted. For example, text recognition software or other software may be utilized to extract text 410 shown in an image region 405. The text recognition software may operate on the image processing server 110 or on a different server.

At block 315, an advertisement database may be searched to identify an advertisement 415 related to the extracted text 410. For example, advertisements in the advertisement database 120 (FIG. 1) may be associated with key words upon which advertisers placed bids. An advertisement 415 that is associated with key words that match or are in some way related to the extracted text 410 may be selected. Commonly owned U.S. Pat. No. 6,269,361 illustrates one system in which advertisers may bid on keywords to position among search results presented to a searcher. In some cases, the selected advertisement 415 may correspond to an advertisement 415 associated with a highest bid amount. The advertisement 415 may also be selected on the basis of different criteria.

In some implementations, other information associated with the text 410 may be identified. For example, a search for the text 410 in an encyclopedia or dictionary database may be performed to provide a definition or other information related to the text 410.

At block 320, data that defines the advertisement 415 and/or other information may be communicated to the user 115. For example, the actual advertisement 415 may be communicated to the user 115. Alternatively, an advertisement tag may be communicated to the user 115. The advertisement tag may cause the user's browser to retrieve an advertisement 415 associated with the advertisement tag from an advertisement server (not shown). The advertisement 415 or other information may be shown in a region adjacent to the image and/or video. For example, a portion of an encyclopedia definition of the text may be displayed adjacent to the image and/or video.

Figure 5:
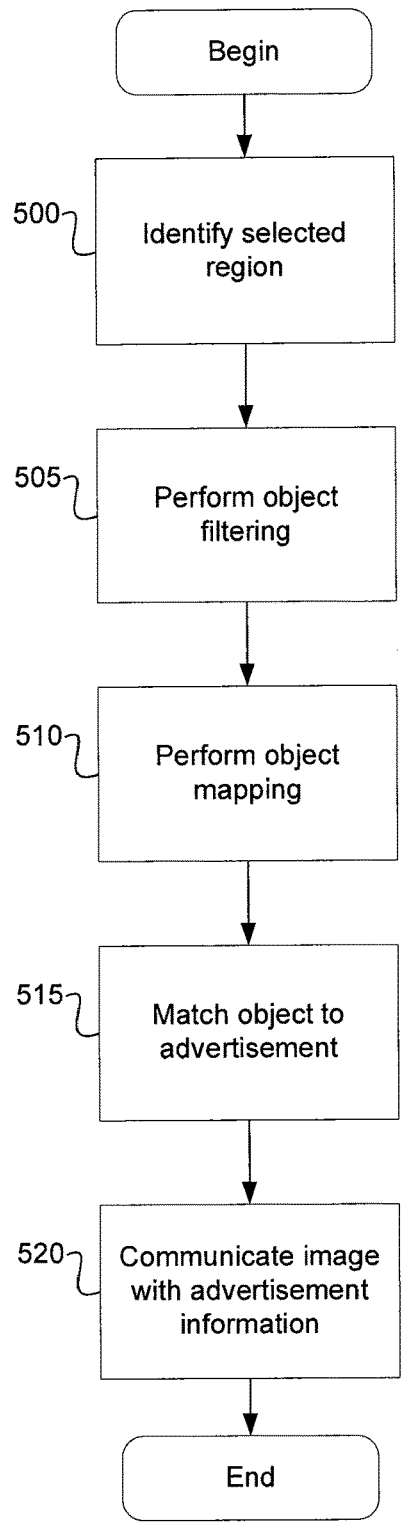
FIG. 5 is a flow diagram for detecting an object in an image region defined by a user selection and for communicating an advertisement or other information associated with the detected object to the user.

FIG. 5 is a flow diagram for detecting an object in a user selection and for communicating an advertisement or other information associated with the object to the user. The operations of FIG. 5 are more clearly understood in reference to the illustrations shown in FIG. 6, which the association of an advertisement with an image displayed to a user. The operations of FIG. 5 may occur in conjunction with the operations of FIG. 3, described above, or alone.

At block 500, a region of a display image and/or video is selected by a user and communicated to the system. For example, a user 115 (FIG. 1) may initially be viewing the original image 600 (FIG. 6), which shows a wine glass. The user 115 may select a region of interest of the original image 600. The region of interest may include a highlighted object that indicates to the user 115 the association of an advertisement or other information with the highlighted object. For example, the user 115 may, via a user selection device, select the wine glass shown in the original image 600. The user may have known to select the wine glass because the wine glass is highlighted. For example, a border may be shown around the wine glass when the user positions a cursor or pointer near the wine glass. Data that defines the user selection 602 may be communicated to the system 100 (FIG. 1). The user selection 602 may include data that defines x and y coordinates of a mouse click and/or the position and size of a selection box. The selection may also include data that defines a scene or a group of scenes selected from a video.

At block 505, object filtering/isolation may be utilized to select an image region 605 that contains an object. Object filtering/isolation encompasses processing an image to enhance targets within a scene and/or degrading non-target objects, as discussed by Kinser, Jason M. and Johnson, John L. (n.d.) "Object Isolation", Retrieved Oct. 28, 2009 from CiteSeer$^X_{beta}$ website: http://citeseerx.ist.psu.edu/viewdoc/summary?doi=10.1.1.45.4940, which is hereby incorporated by reference.

The size of the image region 605 may correspond to a size that just captures the edges that define a particular object in the image region 605. The edge detection may be accomplished via edge detection algorithms or other algorithms. The resulting image region 605 may encompasses the selected object, such as the wine glass selected by the user 115. In other implementations, the size of the image region 605 is predetermined. For example, the size may correspond to a predetermined width and height, such as 100×100 pixels. In yet other implementations, the size of the image region 605 corresponds to a selection box generated by the user 115.

At block 510, object mapping may be performed to identify objects within the image region 605. Object mapping may include comparing the detected shape edges of an object in the image region 605 with a database of object shapes 610, such as a wine glass shape. A correlation algorithm may be utilized to identify the object shape with the highest correlation to the detected shape edges. For example, object mapping may be utilized to determine the object shape 610 that most closely matches a detected object in the image region 605, such as the wine glass shown in FIG. 6.

At block 515, an advertisement database may be searched to identify an advertisement 615 related to the detected object shapes 610. For example, advertisements in the advertisement database may be associated with key words upon which advertisers placed bids. Advertisements associated with key words that match or are in some way related to the object shapes 610 may be selected. In some cases, the selected advertisement 615 may correspond to the advertisement 615 associated with a highest bid, although different criteria may also be utilized.

In some implementations, other information associated with the object may be identified. For example, a search for the text that defines the object shape in an encyclopedia or dictionary database may be performed to provide a definition or other information related to the object shape.

At block 520, the advertisement 615 and/or other information may be communicated to the user 115. For example, the actual advertisement, such as the advertisement pixel data, may be communicated to the user 115. Alternatively, an advertisement tag may be communicated to the user 115. The advertisement tag may cause the user's 115 browser (not shown) to retrieve an advertisement associated with the advertisement tag from an advertisement server (not shown). The advertisement or other information may be shown in a region adjacent to the requested image or video. For example, a portion of an encyclopedia definition of the text may be displayed adjacent to the image or video.

Figure 7:
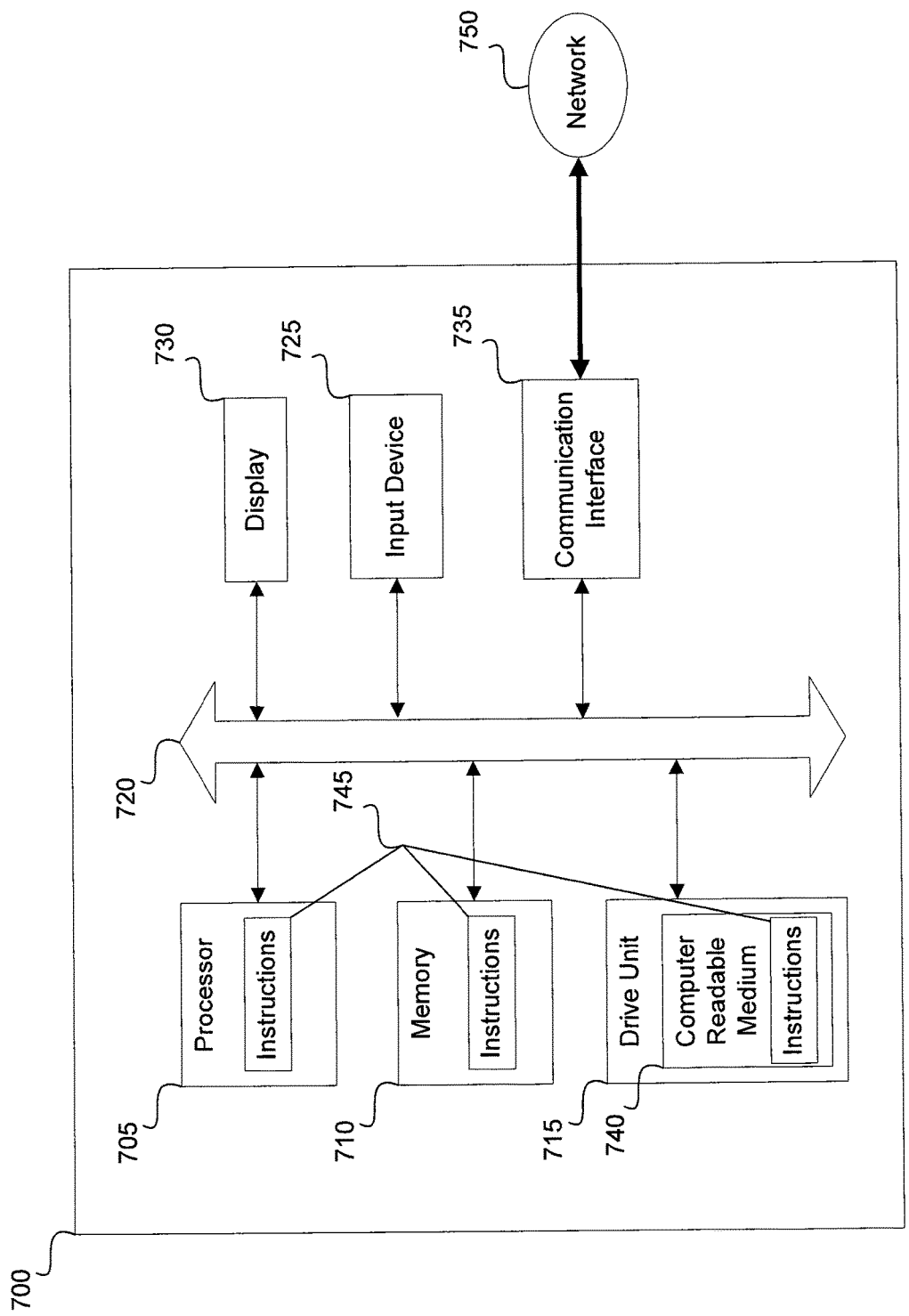
FIG. 7 illustrates a general computer system, which may represent any of the computing devices referenced herein.

FIG. 7 illustrates a general computer system 700, which may represent the front-end server 105, the image processor server 110, or any other computing devices referenced herein. The computer system 700 may include a set of instructions 745 that may be executed to cause the computer system 700 to perform any one or more of the methods or computer-based functions disclosed herein. The computer system 700 may operate as a stand-alone device or may be connected, e.g., using a network, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile device, capable of executing a set of instructions 745 (sequential or otherwise) that specify actions to be taken by that machine. Further, each of the systems described may include any collection of sub-systems that individually or jointly execute a set, or multiple sets, of instructions to perform one or more computer functions.

The computer system 700 may include a memory 710 on a bus for communicating information. The advertisement database 120 may be stored in the memory 710. In addition, code operable to cause the computer system to perform any of the acts or operations described herein may be stored in the memory 710. The memory 710 may be a random-access memory, a read-only memory, a programmable memory, a hard disk drive, or any other type of memory or storage device.

The computer system 700 may include a display 730, such as a liquid crystal display (LCD), a cathode ray tube (CRT), or any other display suitable for conveying information. The display 730 may act as an interface for the user to see the functioning of the processor 705, or specifically as an interface with the software stored in the memory 710 or in the drive unit 715.

Additionally, the computer system 700 may include an input device 725, such as a keyboard or mouse, or other selection device configured to allow a user to interact with any of the components of system 700.

The computer system 700 may also include a disk or optical drive unit 715. The disk drive unit 715 may include a computer-readable medium 740 in which one or more sets of instructions 745, e.g. software, can be embedded. Further, the instructions 745 may perform one or more of the operations as described herein. The instructions 745 may reside completely, or at least partially, within the memory 710 and/or within the processor 705 during execution by the computer system 700. The memory 710 and the processor 705 also may include computer-readable media as discussed above.

The computer system 700 may include a communication interface 735 that enables communications via a network 750. The network 750 may include wired networks, wireless networks, or combinations thereof. The communication interface 735 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which includes all the features enabling the implementation of the operations described herein and which, when loaded in a computer system, is able to carry out these operations. A computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As shown above, the system enables providing advertisements or other information that is more related to a given image or video that the user may be viewing. For example, the user may select a region of an image or video via a user selection device. Data that defines the selection may be communicated to an image processing server. The image processing server may analyze the image region defined by the selection to identify text or objects within the image region. The image processing server may then select advertisements or other information that is related to the identified text and objects. The selected advertisements or other information may then be communicated to the user. A greater return on investment for the advertiser is possible because the advertisement is more related to the text and objects selected by a user.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A method for serving an advertisement in a networked system, the method comprising:
   receiving, by an image processing server and from a web browser running on a user device, user selection data describing a user selection on an image displayed by the web browser, object data identifying an object associated with the user selection, and scripting information configured to indicate coordinates of the user selection, wherein the object includes textual information;
   adaptively determining, by the image processing server, an image region that includes at least a portion of the image based on the coordinates of the user selection and all characters in a particular set of text included in the object, wherein a dimension of the image region is automatically adapted to capture all the characters in the particular set of text detected from the object;
   extracting, by the image processing server, the image region from the image according to an identification of pixels that define the image region;
   determining, by the image processing server, textual content within the image region based on the characters in the particular set of text;
   selecting, by the image processing server, an advertisement associated with the determined textual content within the image region; and
   controlling, by the image processing server, transmission of an advertisement tag embedded into the image to the web browser such that reading the advertisement tag causes the web browser to retrieve the advertisement and display the advertisement in a region adjacent to the image displayed by the web browser.

2. The method according to claim 1, wherein the user selection data, the object data, and the scripting information are received based on a pointer or a cursor moving over or near the object.

3. The method according to claim 1, wherein the user selection data, the object data, and the scripting information are received based on display of the object.

4. The method according to claim 1, wherein the user selection data and the object data defines, at least in part, a scene of a video including the object, and wherein the method further comprises selecting the advertisement according to the scene of the video.

5. The method according to claim 1, wherein selecting the advertisement comprises selecting the advertisement based on the textual content within the image region.

6. The method according to claim 1, wherein selecting the advertisement comprises selecting the advertisement based on object information extracted from the object.

7. The method according to claim 1, wherein the image includes data configured to cause a browser to indicate to the user the object is associated with the advertisement.

8. A method for serving an advertisement in a networked system, the method comprising:
   receiving, by an image processing server, a request to display a requested image, from a user;
   determining, by the image processing server, whether to embed an advertisement into the requested image by a script run by the image processing server, the script configured to use scripting information embedded in the requested image, the scripting information configured to indicate coordinates of a user selection on the requested image;
   adaptively determining, by the image processing server, an image region that includes at least a portion of the requested image based on the coordinates of the user selection, wherein a dimension of the image region is automatically adapted to capture characters in a particular set of text detected from an object corresponding to the user selection;
   extracting, by the image processing server, the image region from the requested image according to an identification of pixels that define the image region;
   determining, by the image processing server, textual content within the image region based on the characters in the particular set of text;
   selecting, by the image processing server, an advertisement associated with the determined textual content within the image region;
   embedding, by the script, an advertisement tag into the requested image; and
   transmitting, by the image processing server, the advertisement tag to a web browser such that reading the advertisement tag causes the web browser to retrieve the advertisement and display the advertisement in a region adjacent to the requested image.

9. The method according to claim 8, wherein the request includes the scripting information, and the scripting information includes data that defines a user selection box that includes an x selection coordinate, a y selection coordinate, a width of the box, and a height of the box.

10. A system for serving an advertisement in a networked system comprising:
    an image processing server configured to:
       receive data that includes a user selection on an image and data associated with a box that encompasses the user selection, and wherein the data associated with the box includes scripting information embedded into the image and configured to indicate coordinates of the box;

adaptively determine an image region that includes at least a portion of the image based on coordinates of the user selection and the data associated with the box, wherein a dimension of the image region is automatically adapted to capture all characters in a particular set of text detected from an object located within the box;

extract the image region from the image according to an identification of pixels that define the image region;

determine textual content within the image region based on the characters in the particular set of text;

select, according to at least the scripting information, an advertisement associated with the determined textual content within the image region; and control transmission of an advertisement tag embedded into the image to a web browser displaying the image such that reading the advertisement tag causes the web browser to retrieve the advertisement and display the advertisement in a region adjacent to the image displayed by the web browser.

11. The system according to claim 10, wherein the scripting information includes an x selection coordinate of the box, and a y selection coordinate of the box.

12. The system according to claim 10, wherein the data defines a scene of a video, and wherein the system further comprises circuitry configured to select the advertisement according to the scene of a video.

13. The system according to claim 10, wherein the image processing server further comprises circuitry configured to extract object information corresponding to the object from the user selection and to select the advertisement according to the object information.

14. The system according to claim 10, wherein the image processing server further comprises circuitry configured to select the advertisement according to the scripting information.

15. Circuitry configured to:
receive data that includes a user selection on an image, wherein the data identifies an object associated with the user selection and includes scripting information configured to indicate coordinates of the user selection, wherein the object includes textual information;

adaptively determine an image region that includes at least a portion of the image based on the coordinates of the user selection and the textual information included in the object, wherein a dimension of the image region is automatically adapted to capture all characters in a particular set of text detected from the object;

extract the image region from the image according to an identification of pixels that define the image region;

determine textual content within the image region based on the characters in the particular set of text;

select an advertisement associated with the determined textual content within the image region; and control transmission of an advertisement tag embedded into the image to a web browser displaying the image such that reading the advertisement tag causes the web browser to retrieve the advertisement and display the advertisement in a region adjacent to the image displayed by the web browser.

16. The circuitry according to claim 15, wherein the scripting information includes an x selection coordinate and a y selection coordinate.

17. The circuitry according to claim 15, wherein the data defines a scene of a video, and wherein the circuitry is further executable to select the advertisement according to the scene of the video.

18. The circuitry according to claim 15, further configured to:
extract the textual information from the image region; and
select the advertisement according to the textual information.

19. The circuitry according to claim 15, further configured to:
provide an interface to bidding on the object.

20. The method according to claim 1, wherein the coordinates of the user selection are x and y coordinates.

21. A method, comprising:
receiving, at an image processing server, user selection data describing a user selection on an image, object data identifying an object associated with the user selection, and scripting information configured to indicate x and y coordinates of the user selection, wherein the object includes textual information;

adaptively determining, by the image processing server, an image region that includes at least a portion of the image based on the x and y coordinates of the user selection and the textual information included in the object, wherein a dimension of the image region is adaptively determined to capture all characters in a particular set of text detected from the object;

determining, by the image processing server, textual content within the image region based on information extracted from the object including at least the characters in the particular set of text detected from the object;

selecting, by the image processing server, an advertisement associated with the determined textual content within the image region; and controlling, by the image processing server, transmission of an advertisement tag embedded into the image to a web browser displaying the image such that reading the advertisement tag causes the web browser to retrieve the advertisement and display the advertisement in a region adjacent to the image displayed by the web browser.

22. The method of claim 21, wherein the data further includes instructions for highlighting the object.

* * * * *